J. Adams,
Shoe Clasp,
Nº 49,061.          Patented Aug. 1, 1865.

Witnesses:
J. H. Kroh
Clark N. Pollard.

Inventor:
John Adams.

UNITED STATES PATENT OFFICE.

JOHN ADAMS, OF KOKOMO, INDIANA.

IMPROVED SHOE-FASTENING.

Specification forming part of Letters Patent No. 49,061, dated August 1, 1865.

*To all whom it may concern:*

Be it known that I, JOHN ADAMS, of Kokomo, Howard county, and State of Indiana, have invented a new and Improved Fastening for Shoes, Harness, &c.; and I do hereby declare that the following is a full and exact description thereof, reference being had to the accompanying drawings, and to the letters of reference marked thereon, which drawings make a part of this specification, in which—

Figure 1:
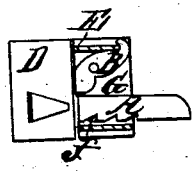
Figure 2:
Figure 3:
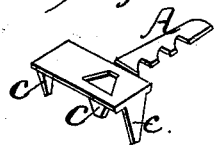
Figure 4:

Figure No. 1 is a perspective view, having the outer plate removed so as to show the shaft with three notches in it and the lever or catch turned up and fastened. Fig. No. 2 is a section showing shaft and tangs. Fig. No. 3 shows shaft and attachment and tangs, giving a full view of notches (three in number) designed to drop over pin $f$ in Fig. 4. Fig. No. 4 is a section showing lever and pin.

This fastening is made by having a shaft, A, firmly set between two plates, D, which plates are fastened to the shoe or harness by means of tangs $c\ c\ c$, which tangs are let into and through the leather, and by being turned down make a firm clinch-fastening of the section. This shaft A is then passed into and between the two plates (in the other half of the fastening) G until the notch drops over the pin $f$. Then, in order to keep the shaft down so as to prevent the notch from slipping off the pin, I raise the small and outer end of the lever B and fasten the notch in the same over the plate E. In brief, the fastening is made of two match sections, one designed for each side of the opening in the shoe or harness to be fastened. Each section is made of two plates, having a space between them, and having three tangs to fasten to the shoe or harness. One section has the shaft with three notches in it. The other section has the pin and lever. The two sections being fastened, one on each side of the opening, the shaft A is passed in between the plates G in the opposite section until the notch in the same drops over the pin $f$, when the lever B is turned up and fastened over the plate E. The fastening is thus adjusted and fastened. In order to let it loose or unfasten it, I turn down the top of the lever B, which allows the shaft A to be lifted up until the notch is lifted off the pin, when the two sections are opened. This entire fastening I make of tin, brass, silver, or any other metallic substance suited to the purpose.

Now I claim as my invention and desire to secure by Letters Patent—

The entire fastening, composed of two sections, one section having the plates, three tangs, and a shaft with three notches, the other section having two plates, a pin and lever, and three tangs, all of which as made and combined to be used in place of buckles, eyelets, laces, &c., on shoes and harness.

Kokomo, Howard county, Indiana, June 6, 1865.

JOHN ADAMS.

Witnesses:
 J. H. KROH,
 CLARK N. POLLARD.